Aug. 18, 1964  J. R. COSS ETAL  3,145,300
DUAL SENSOR GAMMA RAY CALORIMETER
Filed March 7, 1961
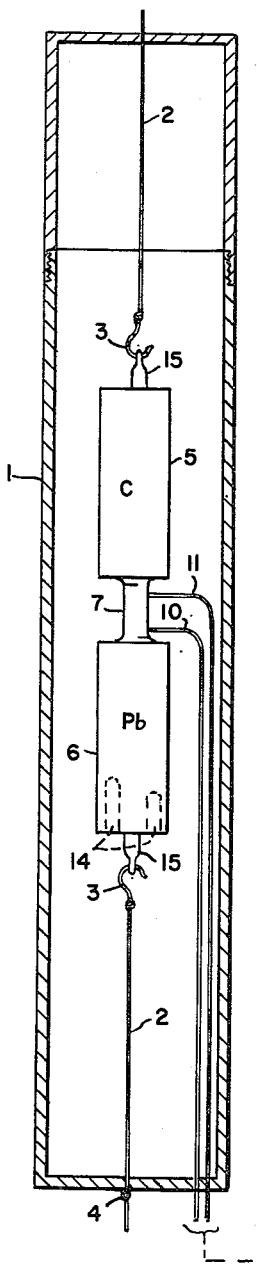
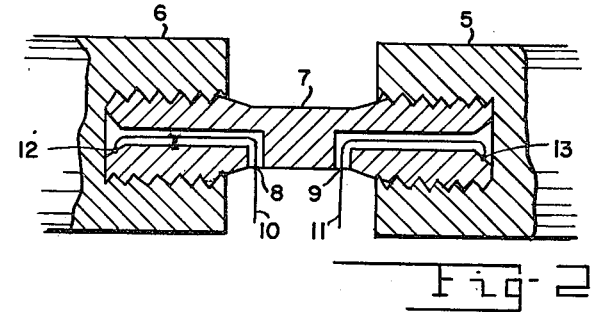
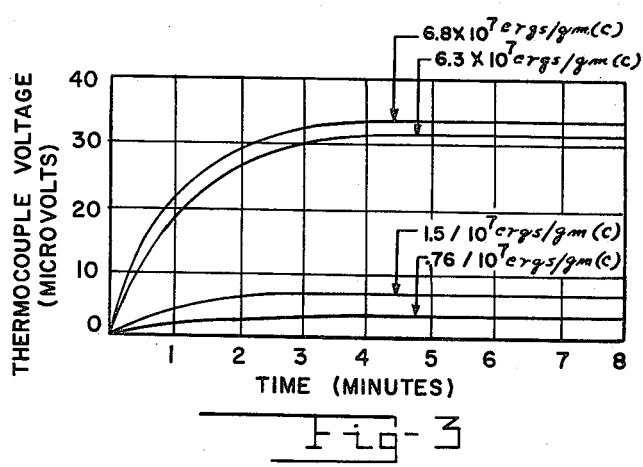
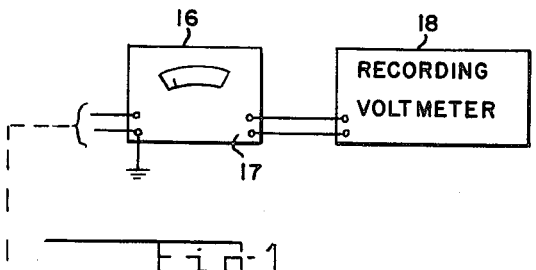
INVENTORS
J.R. COSS, M.J. COTE,
P.B. HEMMIG
BY
ATTORNEY
AGENT 3,145,300
DUAL SENSOR GAMMA RAY CALORIMETER
James R. Coss and Maurice J. Cote, Dayton, Ohio, and Philip B. Hemmig, Rockville, Md., assignors to the United States of America as represented by the Secretary of the Air Force
Filed Mar. 7, 1961, Ser. No. 94,093
7 Claims. (Cl. 250—83)
(Granted under Title 35, U.S. Code (1952), sec. 266)

The invention described herein may be manufactured and used by or for the United States Government for governmental purposes without payment to us of any royalty thereon.

The purpose of this invention is to provide a dosimeter for use in high gamma flux fields that is inexpensive, reliable, accurate, that can be used repeatedly without changing the parameters of the system and that is without dose limitations short of destructive heating.

The calorimeter is intended primarily for the measurement of gamma dose rates in the range above $10^7$ ergs/gm.(C). Described briefly, it consists of a sensing element inside an aluminum shell serving as a thermal radiation buffer. The sensing element comprises two cylindrical volume normalized slugs or solid bodies of dissimilar materials, for example, carbon and lead, connected by a soft iron rod which is threaded into the ends of the bodies. The iron rod serves as both a heat leak between the two bodies and as one leg of a differential thermocouple the other legs of which are two constantan wires welded to the ends of the iron rod. The iron-constantan junctions thus formed are located inside the bodies and therefore assume the temperatures of the bodies. The temperature difference of the bodies is directly related to the dose rate. Consequently, the difference in the two thermocouple voltages, which constitutes the output of the calorimeter, is likewise directly related to the dose rate.

A more detailed description of the invention will be given with reference to the specific embodiment thereof shown in the accompanying drawing in which FIG. 1 is a view, partly in section, of the assembled dosimeter, FIG. 2 shows details of the iron heat leak and thermocouples, and FIG. 3 shows the characteristic of the device for several radiation levels.

Referring to FIG. 1, the sensing element of the dosimeter is contained in an outer shell 1 which acts as a thermal radiation buffer. This shell may be made of aluminum and, in a practical embodiment, may have a diameter of 1", a length of 6" and a thickness of $1/16$", for example. The shell and the sensing element within it are supported by a taut fine nylon thread 2 which passes through the ends of the shell and is attached to the ends of the sensing element as by hooks 3. The fine thread substantially isolates the sensing element from the shell as far as heat conductivity is concerned. The shell may be positioned on the nylon thread by any suitable means such as a knot 4.

The sensing element comprises two cylindrical solid bodies 5 and 6 of dissimilar materials, in this case, carbon and lead, joined by a rod of soft iron 7. The rod 7 is threaded at its ends and screwed into tapped holes in the ends of bodies 5 and 6, as better seen in FIG. 2. Rod 7 also has two passageways 8 and 9 to permit two suitably insulated constantan wires 10 and 11 to reach the ends of the rod 7 where they are spot welded, as at 12 and 13, to form iron-constantan thermocouples. Representative dimensions are a diameter of .379" and a length of 1.01" for each of bodies 5 and 6, and a center diameter of $1/8$" and a length of $3/4$" for rod 7.

The bodies 5 and 6 are preferably gold plated to minimize the effect of thermal radiation losses. Thermal radiation losses and convective effects are further minimized by volume normalization. With regard to volume normalization, it is known from thermodynamics that the temperature rise of a body is dependent on the product:

$$t_r = VpcH \text{ degrees centigrade}$$

where
  $H$ = heat input in calories
  $V$ = volume of material
  $p$ = density of material
  $c$ = specific heat of material If the equilibrium temperature difference between the two body materials is quite small, say 0.1° C. at room temperature, then for a given gamma flux, the difference attributed to convective and radiative heat transfer from the environment can be greatly minimized if:

$$V_1 p_1 c_1 H_1 = V_2 p_2 c_2 H_2$$

or, assuming $H_1 = H_2$, if $$V_1 = \frac{p_2 c_2}{p_1 c_1} V_2$$

Since the density and specific heat are quantities over which there is little or no control, it is possible to change only the volume of the materials involved. For the case of carbon and lead:

$p_c = 1.83$   $p_{pb} = 11.38$
$c_c = .17$   $c_{pb} = .031$ and $$V_c = 1.13 V_{pb}$$

The volume normalization is accomplished by drilling out the lead body so that the volumes are in the calculated ratio, while keeping the surface areas substantially constant. This may be accomplished by drilling one or more holes in the end of the lead body to the depth required, as illustrated at 14 in FIG. 1.

The bodies 5 and 6 may be provided with pins 15 having eyes for receiving hooks 3 attached to the supporting thread 2. These pins may be attached by a press fit into the ends of the slugs.

The operation of the device is as follows: When placed in a radiation field the radiation absorbed by the bodies 5 and 6 causes them to be heated. Each body eventually reaches an equilibrium temperature that is determined by the material, dimensions and shape of the body and by the length, cross sectional area and thermal conductivity of the heat leak 7, and that is directly related to the radiation dose rate. Since the body materials are different the equilibrium temperatures are different and the difference in these temperatures is also directly related to the dose rate. The purpose of thermocouples 12 and 13 is to measure the difference in equilibrium potentials. To this end, thermocouple 12 is subjected to the lead body temperature, thermocouple 13 is subjected to the carbon body temperature and the two thermocouples are connected in series opposing relationship so that the voltage between conductors 10 and 11 is equal to the difference in the voltages generated by the thermocouples. This voltage, which constitutes the output of the dosimeter and is in the microvolt range, is measured by sensitive voltmeter 16. This voltmeter contains an amplifier and produces, at terminals 17, a voltage linearly related to the input voltage and of sufficient magnitude to operate recording voltmeter 18.

FIG. 3 shows four graphs, as would be drawn by recording voltmeter 18, representing the voltage output of the dosimeter described above when subjected to four different radiation dose rates as indicated. In order to convert the output voltage to dose rate it is necessary to determine the sensitivity of the dosimeter. This may be done by subjecting the dosimeter to a known dose and dividing the known dose by the corresponding output voltage reading. For the dosimeter described above, the sensitivity was found to be $2 \times 10^{12}$ ergs/gm.(C)$v$.

We claim:

1. A gamma ray dosimeter comprising as a sensing element two spaced bodies of dissimilar materials joined by a thermally conductive connection, both bodies being subjected to the gamma radiation to be measured and means for producing an electrical output from said sensing element proportional to the difference in the temperatures of said bodies.

2. A gamma ray dosimeter comprising as a sensing element two spaced bodies of dissimilar materials joined by a thermally conductive element forming a heat leak therebetween, both bodies being subjected to the gamma radiation to be measured, a thermocouple in each body, and means connecting said thermocouples in series opposed relation to produce an output voltage equal ot the difference in the voltages generated by said thermocouples.

3. A gamma ray dosimeter comprising as a sensing element two bodies for subjection to the gamma radiation to be measured, said bodies being of the same external size and shape but of dissimilar materials, the volumes of the material in the two bodies being so proportioned that the product of the volume, the specific heat and the density is the same for both bodies, a thermally conductive connection forming a heat leak between said bodies, and means for producing an electrical output from said sensing element proportional to the difference in the temperatures of said bodies.

4. A gamma ray dosimeter comprising a thermal radiation buffering shell having a sensing element supported within the shell by a supporting means having very low heat conductivity, said sensing element comprising two bodies for subjection to the gamma radiation to be measured, said bodies being of the same external size and shape but of dissimilar materials, the volumes of the material in the two bodies being so proportioned that the product of the volume, the specific heat and the density is the same for both bodies, a thermally conductive connection forming a heat leak between said bodies, and means for producing an electrical output from said sensing element proportional to the difference in the temperatures of said bodies.

5. Apparatus as claimed in claim 4 in which said bodies have a highly reflective coating to minimize thermal radiative losses.

6. A gamma ray dosimeter comprising a sensing element having two cylindrical bodies for subjection to the gamma radiation to be measured, said bodies being of the same size but of dissimilar materials, a metallic rod extending between said bodies and terminating inside said bodies, said rod being attached to said bodies in such manner as to provide good heat conductivity between said rod and said bodies, a pair of wires of a metal different from said rod forming like junctions with said rod at its ends to form like thermocouples within said bodies, and means for measuring the voltage between said wires.

7. A gamma ray dosimeter comprising a thermal radiation buffering shell having a sensing element supported within the shell by a supporting means having a very low heat conductivity, said sensing element comprising a lead body and a carbon body both of which are subjected to the gamma radiation to be measured, said bodies having cylindrical surfaces of the same dimensions but the volume of lead in said lead body being a fraction of the volume of carbon in said carbon body equal to the product of the density and specific heat of carbon divided by the product of the density and specific heat of lead, a heat leak between said bodies in the form of an iron rod extending between said bodies and terminating inside said bodies, said rod being attached to said bodies in such manner as to provide good heat conductivity between said rod and said bodies, passageways extending through said rod from each end to points on said rod outside said bodies, a constantan wire passing through each passageway and joined to said rod at its end to form an iron-constantan thermocouple at each end of the rod, and means for measuring the voltage between said wires.

References Cited in the file of this patent

UNITED STATES PATENTS

| 1,386,227 | Becket | Aug. 2, 1921 |
| 2,579,994 | Zinn | Dec. 25, 1951 |
| 2,745,284 | Fitzgerald | May 15, 1956 |
| 2,938,122 | Cole | May 24, 1960 |
| 2,942,110 | Lehovec | June 21, 1960 |
| 2,972,654 | Fritts et al. | Feb. 21, 1961 |
| 3,033,985 | Petree | May 8, 1962 |